United States Patent [19]
Frings et al.

[11] Patent Number: 5,741,845
[45] Date of Patent: Apr. 21, 1998

[54] PROCESS FOR PRODUCTION OF AZO MACROINITIATORS FOR THE SYNTHESIS OF BLOCK COPOLYMERS AND OF AQUEOUS BLOCK COPOLYMER DISPERSIONS AND EMULSIONS AND THE USE THEREOF

[75] Inventors: Rainer B. Frings, Berlin, Germany; Shigeru Komazaki, Izumiootsu, Japan; Gerwald F. Grahe, Berlin, Germany

[73] Assignee: Dainippon Ink & Chemicals Inc., Tokyo, Japan

[21] Appl. No.: 488,414

[22] Filed: Jun. 7, 1995

Related U.S. Application Data

[62] Division of Ser. No. 191,357, Feb. 3, 1994, abandoned, which is a continuation of Ser. No. 911,728, Jul. 10, 1992, abandoned.

[30] Foreign Application Priority Data

Jul. 11, 1991 [DE] Germany .................. 41 23 223.2

[51] Int. Cl.$^6$ .................................................. C08L 31/00
[52] U.S. Cl. .................... 524/533; 523/402; 523/415; 523/423; 524/457; 524/458; 524/460; 524/500; 524/502; 524/505; 524/506; 524/507; 524/513; 524/514; 524/529; 524/534; 524/535; 524/537; 524/538; 524/539; 524/547; 524/555; 524/556; 524/588; 524/589; 524/591; 524/860; 524/866
[58] Field of Search ................... 524/457, 501, 524/505, 533, 458, 460, 500, 502, 506, 507, 513, 514, 529, 534, 535, 537, 538, 539, 555, 556, 588, 589, 591, 860, 866, 547; 523/402, 415, 423

[56] References Cited

U.S. PATENT DOCUMENTS

| | | | |
|---|---|---|---|
| 3,763,729 | 10/1973 | Sheppard et al. | 260/89.5 |
| 3,909,497 | 9/1975 | Hendry et al. | 260/77.5 |
| 4,539,362 | 9/1985 | Davies et al. | 524/458 |

FOREIGN PATENT DOCUMENTS

| | | |
|---|---|---|
| 0 413 459 A2 | 2/1991 | European Pat. Off. |
| 0413459 | 2/1991 | European Pat. Off. |
| 1 803 339 | 6/1969 | Germany |

OTHER PUBLICATIONS

German DE 3 005 889, Sep. 3, 1981. (English Abstract).
East German DD 235 651 A1, May 14, 1986, (English Abstract).
Patent Abstracts of Japan, 62-296,450, May 31, 1989.
Patent Abstracts of Japan, 60-94,298, Nov. 10, 1986.
Patent Abstracts of Japan, 63-57,774, Sep. 14, 1989.

*Primary Examiner*—Judy M. Reddick
*Attorney, Agent, or Firm*—Armstrong, Westerman, Hattori, McCleland, & Naughton

[57] ABSTRACT

The invention concerns a process for the production of block copolymers or aqueous dispersions and emulsions thereof, whereby azo macroinitiators are reacted with radical-polymerizable monomers or a mixture of several radical-polymerizable monomers. The azo macroinitiators are obtained by reacting simple reactive azo compounds with prepolymers with a molecular weight between 400 and 20000, which possess at least 2 functional groups, e.g. polyurethanes or polyesters.

The aqueous block copolymer dispersions and emulsions produced according to the invention are suitable for use for the production of paints, adhesives etc.

2 Claims, No Drawings

PROCESS FOR PRODUCTION OF AZO MACROINITIATORS FOR THE SYNTHESIS OF BLOCK COPOLYMERS AND OF AQUEOUS BLOCK COPOLYMER DISPERSIONS AND EMULSIONS AND THE USE THEREOF

This is a divisional of application Ser. No. 08/191,357 filed Feb. 3, 1994, now abandoned, which is a continuation of application Ser. No. 07/911,728, filed Jul. 10, 1992, abandoned.

BACKGROUND OF THE INVENTION

The present invention relates to a process for the production of azo macroinitiators for the synthesis of block copolymers and for the production of aqueous block copolymer dispersions and emulsions, and to uses thereof.

Polymers are made from monomers or from other polymers by appropriate reactions. According to the IUPAC, in these so-called polyreactions, a distinction is made between polymerization and polycondensation. Polycondensation is characterized by a repeated condensation process in the course of which simpler molecules are eliminated. For example, many polyamides are prepared from diamines and dicarboxylic acids by this process with elimination of water molecules.

On the other hand, during polymerization, continuing addition of molecules to one another takes place, without simultaneous elimination of another molecule. These reactions are generally triggered by so-called polymerization initiators, which can be of an anionic, cationic, or radical nature.

Although the nature of the monomers is of decisive importance for the selection of the initiator, nonetheless, if possible, preference is given to radical polymerization.

The production of block copolymers also takes place by radical polymerization. A survey of the various methods of synthesis is, for example given, in the "Encyclopaedia of Engineering Materials, Part A, Polymer Science and Technology, Volume 1, Part 4, Synthesis and Characterization of Block Copolymers" (Marcel Dekker Inc. 1988). Of the various detailed papers, in particular those of J. Furukawa (Agnew. Makrom. Chem. 1 (1967), 92); S. Nagai (J. Polym. Sci., Part A 24 (1986), 405); J. Piirma (J. Appl. Polym. Sci. 26 (1981), 3103); as well as that of B. Hazer (Agrew. Makrom. Chem. 129 (1985), 31), may be mentioned.

The block copolymers made by the methods described, particularly those based on urethane and acrylic polymers, have outstanding application technology properties. Preferred use fields are therefore surface coatings and varnishes (see Japanese Specification First Publication Hei 3-74420).

However, a problem in the production and use of block copolymers is the use of non-aqueous solvent systems, which must be regarded as problematical in relation to environmental and industrial hygiene. For this reason, the present trend is towards the use of aqueous polymer dispersions or emulsions.

However, until now, very few synthetic methods for block copolymers in aqueous dispersion have been developed. Thus, D. Mikulasova (Makrom. Chem. 175 (1974), 2091) describes a method for the synthesis of vinyl and vinyl block copolymers in emulsion using long-lived radicals. Similarly, I. Piirma (J. Appl. Polym. Sci. 33 (1987), 727) describes a synthesis of vinyl and vinyl block copolymers in a two-stage radical polymerization using azo and peroxo radical starters. Block copolymers of polyvinyl chloride and polyethylene oxide were synthesized by J. J. Laverty (J. Polym. Sci., Polym. Chem. Ed. 15 (1977), 2001) and by S. Nagai (Chemistry Express 1 (9), (1986), 543) using polymethylene oxide with azo groups. G. Smets (J. Polym. Sci., Polym. Chem. Ed. 16 (1978), 3077) uses polymeric peroxides as initiators for the synthesis of block copolymers. In this context, reference should also be made to an emulsion polymerization in which surfactant polymeric azo initiators serve as emulsifiers (W. Heitz (Makrom. Chem. Rap. Commun. 2 (1981), 83)).

Emulsion block copolymers are gaining ever-increasing importance in the field of surface coatings, especially as paints, as can for example clearly be seen from JP First Publication HEI 1-254780, which describes the use of block copolymers of polyethylene glycols and polyacrylates as paints.

However, for the present, as can be seen from the known state of technology, the markedly increased interest in emulsion block copolymers cannot yet be satisfactorily accommodated, since their production requires a difficult and costly production process.

Heretofore, conventional procedures for the production of the azo macroinitiators as a starting component for the production of aqueous dispersions and emulsions of block copolymers are characterized in that:

A) All components are added dropwise simultaneously, or

B) Isocyanate-terminal polymers are prepared from a polymer with functional terminal groups by reaction with a diisocyanate, and this then reacts with suitable stoichiometric amounts of an azo alcohol.

Azo macroinitiators which are not very homogeneous in their molecular composition are obtained.

SUMMARY OF THE INVENTION

It is an object of the present invention to provide a process for the production of azo macroinitiators using reactive azo initiators. It is another object of the present invention to provide a process for the production of block copolymers and aqueous dispersions and emulsion of the block copolymers.

According to one aspect of the present invention, there are provided processes for the production of azo macroinitiators characterized in that an azo initiator of formula I:

$$O=C=N-R_4-NH-\overset{O}{\underset{}{C}}-O-R_3-\underset{R_2}{\overset{R_1}{\underset{|}{C}}}-N=N-\underset{R_2}{\overset{R_1}{\underset{|}{C}}}-R_3-O-\overset{O}{\underset{}{C}}-NH-R_4-N=C=O \qquad I$$

wherein $R_1$ is —$CH_3$ $R_2$ is —CN, —$CH_3$

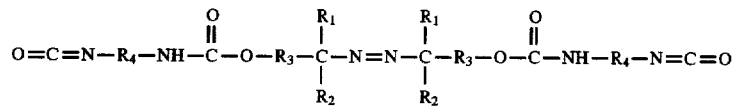
$CH_2$— with R, R'=—$CH_3$—$CH_2OH$ and $R_4$ is linear or branched aliphatic, cycloaliphatic, aromatic, or arylaliphatic residues with 2-100 carbon atoms, is reacted with prepolymers with isocyanate-reactive end groups if necessary with the aid of aliphatic diamines or hydrazine as chain lengtheners in a suitable solvent and in suitable stoichiometric ratios to one another at temperatures between 20° C. and 50° C., if necessary with the aid of 0.05 to 2 wt % of a suitable catalyst or catalyst mixture, to produce an azo macroinitiator with at least one polymerization-initiating azo group and the molecular weight lies between 1500 and 60000 g/mol, preferably between 2000 and 45000 g/mol.

Suitable prepolymers are polyurethane, polyacrylate, polybutadiene, silicone, polyether, and polyester.

According to another aspect of the present invention, there are provided processes for the production of block copolymers characterized in that one of the azo macroinitiators is reacted with a radical-polymerizable monomer or a mixture of several radical-polymerizable monomers from the classes of vinyl, acrylate, and methacrylate compounds, as a mixture or diluted with a suitable solvent, at temperatures between 50° C. and 140° C., whereby the ratio of azo macroinitiator to radical-polymerizable vinyl polymer ranges from 2:98 to 95:5 parts by weight.

According to another aspect of the present invention, there are provided processes for the production of aqueous block copolymer dispersions using the above block copolymer or the above azo macroinitiator.

Additionally, there is provided a method of using the above aqueous block copolymer dispersion or the above block copolymer.

DETAILED DESCRIPTION OF THE INVENTION

According to the invention block copolymers and aqueous emulsions and dispersions thereof of the general formula X

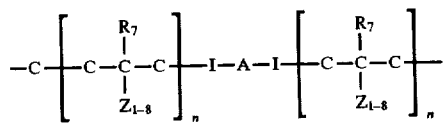

wherein $Z_1$ represents ester groups with 1-18 C atoms in the alcohol residue $Z_2$ represents phenyl or tolyl groups $Z_3$ represents nitrile, Cl, or F groups $Z_4$ represents a hydroxyalkyl ester side-chain $Z_5$ represents a —COOH or -propylsulphonic acid group $Z_6$ represents a primary, secondary, or tertiary amide group $Z_7$ represents an ester-group with a tertiary amino funtion in the alcohol residue $Z_8$ represents a glycidyl group, which may be present alone or in a mixture $R_7$ is —H, —CH$_3$, SO$_3$—, —COO—, epoxy groups or —COOR with R=1-18 C atoms, Cl, F and n=the repetition unit, I stands for the molecular building blocks remaining on decomposition of the azo initiator groups of the intermediately formed compound I

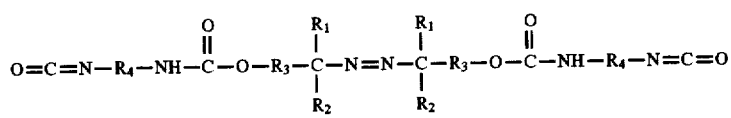

and A stands for the azo macroinitiator, prepared by reaction of an azo macroinitiator A with a radical polymerizable monomer or a mixture of several radical polymerizable monomers from the classes vinyl, acrylate, and methacrylate compounds, as a mixture or diluted with a suitable solvent.

The vinyl-type monomers are mainly vinyl-type carboxylic acids and derivatives thereof, such as, e.g., methacrylic acid and its esters with 1-18 C atoms in the side chain. In one case, the block copolymerization is carried out in an organic solvent, and after completion of the block polymerization of the polymer solution, is dispersed in water, if necessary, with simultaneous removal of the solvent and using dispersant additives and emulsifiers. In the second variant, the solvent-free azo macroinitiator is dispersed in water with suitable emulsifiers or emulsifying mixtures, if necessary with the aid of small quantities of organic solvents, and the radical polymerizable monomer, or mixtures of such monomers, is polymerized by the dispersed azo macroinitiator at an elevated temperature, preferably between 50°-100° C., to form block copolymer emulsions.

The azo macroinitiators required for the production of aqueous dispersions and emulsions of block copolymers, according to the present invention, are obtained from an azo compound of the formula I

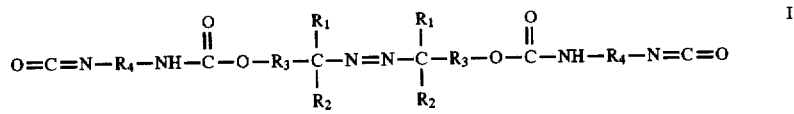

wherein $R_1$ is —CH$_3$ $R_2$ is —CN, —CH$_3$ $R_3$ is —CONHCH$_2$CH$_2$—, —(CH$_2$)$_{1-2}$— —CONHC(RR') CH$_2$— with R, R'=—CH$_3$ —CH$_2$OH and $R_4$ is linear or branched aliphatic, cycloaliphatic, aromatic, or arylaliphatic residues with 2-100 carbon atoms, and a suitable prepolymer.

Prepolymers which have been found to be particularly suitable for this are those with at least 2 functional terminal groups, such as, e.g., hydroxyl, thiol, amino, or acid groups, where the prepolymers may come from polyurethanes, polyacrylates or -methacrylates, polyesters, polybutadienes, aminopropyl, dimethylpolydimethylsiloxanes, polydimethylsiloxane carbonols, polyethers, polyepoxides, polyactones, polycarbonates, polyamides, etc. Their molecular weight should be between 400 and 20,000, preferably between 1000 and 10,000.

The reaction takes place at temperatures of 0°–60° C., and preferably between 20°–50° C. This method is simpler than the method known from the prior art which uses an azo-group containing acid chloride.

If necessary, an increase in molecular weight of the azo macroinitiator can be achieved by the addition of further diisocyanate or by means of chain lengtheners from the group of aliphatic diamines, dialcohols, and hydrazine in suitable stoichiometric ratios, based on the hydroxyl- or amino-group containing prepolymer, and the azodiisocyanate.

The lower molecular weight azo initiators of the formula I are obtained by reaction of an azo compound which has hydroxy groups and a diisocyanate.

Suitable azo compounds, which must have one or more azo groups, and two or more hydroxy groups, are, for example, azobiscyanopropanol, azobiscyano-n-butanol, azobismethyl-N-hydroxyethylpropionamide, and azoamidopolyalcohols, such as are for example produced by Wako Pure Chemical industries, Osaka, Japan.

Especially suitable as diisocyanates are aliphatic and aromatic isocyanates which have at least two isocyanate groups. This requirement is met, e.g., by isophorone diisocyanate, hexamethylene diisocyanate, 2,2,4-trimethyl hexamethylene diisocyanate, toluene diisocyanate, xylene diisocyanate, diphenylmethane diisocyanate, 1,3-bis (diisocyanatomethyl)cyclohexane, tetramethylene diisocyanate, trimethylcyclohexyl diisocyanate, methylcyclohexane-2,4-diisocyanate, methylcyclohexane-2, 6-diisocyanate, 4,4-methylene-bis(cyclohexylisocyanate), and polyisocyanates, made up of diisocyanates, polyols, polyesters, and polyamines.

Suitable solvents for the preparation of the low molecular weight azo initiators and azo macroinitiators of the invention are aromatics such as, e.g., toluene and xylene. Also suitable are ketones such as acetone, 2-butanone, methyl isobutyl ketone, and cyclohexanone. In addition to these, also suitable are esters such as methyl acetate and ethyl acetate, and also nitrogen-containing solvents such as, for example, N-methylpyrrolidone, or N,N-dimethylformamide, and also radical polymerizable monomers.

As catalysts, stannous compounds such as dibutyltin laurate and amines such as DABCO (1,4-diazabicyclo[2.2. 2]octane), and DBU (1,8-diazabicyclo[5.4.0]-undec-7-ene), and mixtures thereof in typical concentrations of 0.05 to 2.0 wt %, based on the reactive components, may be used.

The azo macroinitiators needed for the production of aqueous block copolymer dispersions should have molecular weights of 1500 to 60,000, and preferably of 2,000 to 45,000. If the molecular weight is below 1500, the content of azo groups in the polymer is too low and the conversion of the monomers becomes too low. If, on the other hand, the molecular weight is above 60,000, the solubility of the azo macroinitiators in solvents and in the monomers decreases drastically.

The process of the invention for the production of aqueous block copolymer dispersions provides that, first, block copolymers are prepared in suitable solvents, in a manner similar to that described by J. Furukawa (Agnew. Makrom. Chem. 1 (1967), 92). Here, the ratio of azo polymer to vinyl polymer can range from 2:98 to 95:5 (in each case, parts by weight), and preferably from 5:95 to 50:50 (in each case, parts by weight). More than one azo macroinitiator can also be used.

After the polymerization in a solvent, according to the invention, the solvent is replaced by water. Water solvents are therefore advantageous in the polymerization, most preferably ketones such as acetone, 2-butanone, and methyl isobutyl ketone, and additionally, alcohols such as methanol, ethanol, and tertiary butanol, have been found to be particularly advantageous. In addition, some solvents not miscible with water can also be used. Particularly advantageous are solvents which form a low-boiling azeotrope with water.

The monomers usable according to the invention are most preferably acrylates and methacrylates such as, for example, methyl (meth)acrylate, ethyl (meth)acrylate, butyl (meth) acrylate, 2-ethylhexyl (meth)acrylate, lauryl (meth)acrylate, stearyl (meth)acrylate, cyclohexyl (meth)acrylate, and benzyl (meth)acrylate, and in addition to these, (meth) acrylamide and N-methoxymethyl (meth)acrylamide. Also usable are aromatic monomers such as styrene, α-methyl styrene, and vinyl toluene. In addition, however, aliphatic vinyl monomers such as vinyl acetate and "Veova" (aliphatic vinyl ester, Shell) are also suitable. Similarly, vinyl monomers, which have functional groups such as, for example, hydroxy groups, are also usable. Among these are, hydroxyethyl (meth)acrylate, hydroxypropyl (meth) acrylate, and hydroxybutyl (meth)acrylate. However, nitrile-group containing monomers such as, for example, (meth) acrylonitrile, are also suitable. Polymers usable in the sense of the invention can also contain epoxy groups such as glycidyl (meth)acrylate and methylglycidyl (meth)acrylate. They can, however, also be esters of unsaturated carboxylic acids with C1–C18 alcohols such as, for example, maleate esters and fumarate esters. Halogenated monomers such as tetrafluoroethylene and hexafluoropropylene can also be used. The monomers can be used alone or in mixture.

In the polymerization monomers containing acid functional groups such as (meth)acrylic acid, crotonic acid, maleic acid, fumaric acid, and itaconic acid must be used, in order to ensure a certain dispersibility for the polymer. Here, the acid number should be between 5 and 200, and preferably between 10 and 150. If the acid value is lower than 10, dispersion of the block copolymers is no longer possible, while with an acid value of more than 150, the block copolymer is water-soluble.

The polymerization temperature should be between 50° C. and 140° C. In order to achieve complete polymerization, the duration of the reaction should be between 5 and 24 hours; however, if necessary, shorter or longer reaction times can also be chosen.

The aforesaid azo macroinitiators are used as initiators, but if necessary, other azo compounds or peroxides can also be used in addition.

To regulate the molecular weight, compounds such as phenols and allyl compounds are suitable.

The production of the block copolymers can be performed both as a single-batch process, in which azo macroinitiator and unsaturated monomer are heated in a solvent; alternatively, one of the two reactive components may be dropped into the solution of the other components at polymerization temperature.

After completion of the polymerization reaction, an amine is added to the polymer solution, the amount of amine being selected to be somewhat greater than the corresponding molar equivalent of the acid groups of the polymer. Particularly suitable are volatile amines such as aqueous ammonia solution, trimethylamine, or similar compounds. The amine-containing polymer solution is then dispersed in water, if necessary using additional dispersant additives and emulsifiers, or is dissolved in water, and if necessary the solvent is removed by suitable processes.

Instead of the acid group containing monomers, monomers which contain amino groups, such as, for example, dimethylaminoethyl (meth)acrylate and dimethylaminopropyl (meth)acrylate, can also be used in the polymerization. Here, the amine number should be between 5 and 200, and preferably between 10 and 150.

After completion of the polymerization reaction, acid is added to the polymer solution, the amount of acid being chosen to be somewhat greater than that corresponding to the molar equivalent of the amino groups of the polymer. Suitable are, e.g., hydrochloric acid, sulfuric acid, formic acid, propionic acid, lactic acid, etc.

The quantity of water added should be large enough for the solvent to be completely removed from the reaction mixture by an azeotropic distillation. The solids content of the dispersion should be 10 to 80, and preferably between 20 and 50 wt %.

For the production of aqueous block copolymer emulsions, first, a solution of the azo macroinitiator in vinyl monomers is dispersed in water with the addition of dispersant additives, such as emulsifiers or protective colloids. The solution of the azo macroinitiator in the vinyl monomer can also additionally contain a solvent, which should not be miscible with water. However, small quantities of a water-soluble solvent do not result in significant problems.

The azo macroinitiator can either be dissolved in the total desired quantity of the vinyl monomers or only in a small part, in which case the remainder of the monomer is then added continually dropwise during the polymerization.

The emulsifiers can be anionic, cationic, and non-ionic. Especially suitable are sodium dodecylbenzenesulphonate, nonylphenyl polyether sulphate, polyoxyethylene lauryl ether, polyoxyethylene lauryl phenyl ether, polyoxyethylene-polyoxypropylene block copolymers, cetyltrimethyl-ammonium bromide, and laurylpyridinium chloride. The simultaneous use of two or more emulsifiers is possible.

Suitable as dispersant additives are aqueous oligomers and water-soluble polymers such as polyvinyl alcohol or hydroxyethyl cellulose. The dispersant additives can be used together with the emulsifiers.

The quantity of the emulsifiers and dispersant additives used should be below 10%, preferably below 5% based on the total quantity of azo macroinitiator and monomer.

The ratio of azo macroinitiator to vinyl monomer can be 2:98 to 95:5 parts by weight, preferably 5:95 to 50:50 parts by weight. More than one azo macroinitiator can be used.

Suitable as vinyl monomers based on acrylate and methacrylate such as methyl (meth)acrylate, ethyl (meth) acrylate, butyl (meth)acrylate, 2-ethylhexyl (meth) acrylate, lauryl (meth)acrylate, stearyl (meth)acrylate, cyclohexyl (meth)acrylate, and benzyl (meth)acrylate. Also suitable are aromatic monomers such as styrene, α-methylstyrene, and vinyl toluene. Monomers containing amide groups such as (meth)acrylamide and N-methoxymethyl (meth)acrylamide, aliphatic vinyl monomers such as vinyl acetate and "Veova" (aliphatic vinyl ester, Shell), vinyl monomers with hydroxy groups, such as hydroxyethyl (meth)acrylate, hydroxypropyl (meth)acrylate and hydroxybutyl (meth)acrylate, monomers containing nitrile groups, such as (meth)acrylonitrile, vinyl monomers containing epoxy groups such as glycidyl (meth) acrylate and methylglycidyl (meth)acrylate, vinyl diesters such as maleate esters and fumarate esters, in which the carboxylic acid function is esterified with a C1–C18 alcohol, halogen-containing monomers such as tetrafluoroethylene and hexafluoropropylene and also vinyl monomers with acid functions such as (meth)acrylic acid, crotonic acid, maleic acid, fumaric acid, and itaconic acid can also be used.

The polymerization temperatures during the emulsion polymerization described above should be between 65° C. to 95° C. Lower temperatures significantly decrease the reaction rate; higher temperatures destroy the micelles of the emulsion.

In order to ensure complete removal of the monomers by reaction, the reaction time should be between 5 and 24 hours. However, shorter or longer reaction times can also be chosen.

If necessary, other azo and/or peroxo compounds can also be used as initiators in addition to the aforesaid azo macroinitiators.

After complete reaction of the azo groups and of the vinyl monomers, a stable aqueous emulsion or dispersion of block copolymers is obtained, the solids content of these emulsions or dispersions being between 10 and 80, and preferably between 20 and 50 wt %.

Chain-terminating substances such as phenols and allyl compounds serve to regulate the molecular weight.

The advantages of the process of the invention for the production of aqueous block copolymer systems lie in the non-extreme conditions and simple preparation of the azo initiators required for the synthesis of the azo macroinitiators by a simple addition reaction without byproducts at temperatures lying below the decomposition temperature of the azo group. This is a significant advance compared with the previously known syntheses from azodiacid chlorides.

Prepolymers for production of azo macroinitiators are simple to prepare or commercially available in all desired compositions and molecular weights, and can be coupled with the azo initiators of the invention under particularly mild conditions in a simple addition procedure without by-products.

The aqueous block copolymer dispersions and emulsions prepared by the process of the invention are characterized by low content of volatile organic solvents, which renders their use among other things for the production of paints, films, sheets, dispersant additives for paints or colors, compatibility improvers for polymer mixtures and adhesives particularly harmless to the environment.

Block copolymers, which cannot be prepared by anionic polymerization, such as, for example, poly(butadiene-block-methylmethacrylate), can also be prepared from the azo macroinitiators of the invention.

The processes of the invention allow the simple coupling of OH- or NH- terminal prepolymers of the most varied polymer types with any vinyl monomers and mixtures thereof.

The coupling of the polymer block to be radical polymerized can be effected by the particularly simple emulsion polymerization, whereby the block copolymer produced can be isolated in bulk by known and simple processes, and then be further processed by suitable shaping processes into sheets, films, or molded articles.

The invention will be illustrated below by means of examples; for brevity, "parts" means "parts by weight" throughout the examples.

Preparation of the Azo Initiator of Formula I

EXAMPLE 1

10.3 parts (52.5 mmol-equiv.) of 2,2'-azobis[2-(hydroxymethyl)-propionitrile] were added to a solution of 23.4 parts (105 mmol-equiv.) isophorone diisocyanate (IPDI), 50.4 parts methyl ethyl ketone (MEK), and 0.17 parts dibutyltin dilaurate (DBTDL) and stirred at 30° C. After 2 hours of stirring, the solution became clear and the NCO-content had fallen to half the original value.

EXAMPLE 2

2.74 parts (9.49 mmol-equiv.) of 2,2'-azobis[2-methyl-N-(2-hydroxyethyl)-propionamide] were added to a solution of 4.22 parts (19.0 mmol-equiv.) IPDI, 4.64 parts MEK, and 0.015 parts DBTDL and heated to 35° C. After 2 hours of stirring, the solution became clear and the NCO-content had fallen to half the original value.

EXAMPLE 3

2.67 parts (13.6 mmol-equiv.) of 2,2'-azobis[2-(hydroxymethyl)-propionitrile] were added to a solution of 4.58 parts (27.2 mmol-equiv.) HMDI, 29.0 parts 1,4-dioxane, and 0.036 parts DBTDL and heated to boiling. After 2 hours of stirring, the solution became clear and the NCO-content had fallen to half the original value.

Preparation of the Azo Macroinitiators

EXAMPLE 4

29.00 parts (66.2 mmol-equiv.) of polypropylene glycol 425 (PPG-425) and 0.15 parts DBTDL were added to 84.17 parts (52.5 mmol-equiv.) of the solution from Example 1, and the reaction mixture was stirred at room temperature for one day. The azo ether polymer formed was obtained as a light yellow viscous solution with a solids content of 44.2%. The molecular weights were determined by gel permeation chromatography (GPC) (GPC calibrated against polystyrene standards): Mn=4000; Mw/Mn=2.2.

EXAMPLE 5

50.0 parts (9.49 mmol-equiv.) of the reaction product from 1740 parts (13.0 mmol-equiv.) dipropylene glycol with 2020 parts (12.0 mmol-equiv.) hexamethylene diisocyanate (HMDI) and 0.15 parts DBTDL were added to 11.615 parts (9.49 mmol-equiv.) of the solution from Example 2, and the reaction mixture was stirred at room temperature for one day. The azo urethane polymer formed was obtained as a light yellow viscous solution with a solids content of 60.0%. The molecular weights were determined by gel permeation chromatography (GPC) (GPC calibrated against polystyrene standards): Mn=15000; Mw/Mn=6.7.

EXAMPLE 6

46.1 parts (14.8 mmol-equiv.) of polyester ES 56 dissolved in MEK with a solids content of 70% (Reichold Chemie AG, Vienna) and 0.10 parts DBTDL were added to 36.29 parts (13.6 mmol-equiv.) of the solution from Example 3, and the reaction mixture was stirred at room temperature for one day. The azo ester polymer formed was obtained as a light yellow viscous solution with a solids content of 48.0%. The molecular weights were determined by gel permeation chromatography (GPC) (GPC calibrated against polystyrene standards): Mn=9400; Mw/Mn=3.2.

EXAMPLE 7

50.0 parts (12.0 mmol-equiv.) of polysiloxane PS 510 (solution MEK with a solids content of 60% were added to 19.23 parts (12.0 mmol-equiv.) of the solution from Example 1, and the reaction mixture was stirred at room temperature for one day. The azo siloxane polymer formed was obtained as a light yellow viscous solution with a solids content of 54.5%. The molecular weights were determined by gel permeation chromatography (GPC) (GPC calibrated against polystyrene standards): Mn=32000; Mw/Mn=2.2.

Preparation of Block Copolymers

EXAMPLE 8

33.3 parts of the solution of the azo macroinitiator from Example 5 were added to a mixture of methyl methacrylate (31.5 parts), ethyl acrylate (45.5 parts), methacrylic acid (3.1 parts), n-butanol (20.0 parts) and methyl isobutyl ketone (66.7 parts). The solution was thoroughly purged with nitrogen and heated at 98° C. to 103° C. with stirring for 20 hours. The conversion of the monomer was 100%. Next, a mixture of 8.56 parts triethylamine and 400 parts water was added slowly with stirring. After solution had occurred, the solvent was removed by vacuum distillation to yield an aqueous dispersion with a solids content of 31.3%.

EXAMPLE 9

36.7 parts of the solution of the azo macroinitiator from Example 7 were added to a mixture of methyl methacrylate (42.5 parts), butyl acrylate (35.2 parts), methacrylic acid (3.1 parts), butyl acrylate (35.2 parts), methacrylic acid (3.1 parts), and MEK (133.0 parts). The solution was thoroughly purged with nitrogen and heated at 80° C. for 20 hours with stirring. The conversion of the monomer was 100%. Next, a mixture of 3.5 parts of a 25% aqueous ammonia solution and 420 parts water was added slowly with stirring. After solution had occurred, the solvent was removed by vacuum distillation to yield an aqueous dispersion with a solids content of 20.1%.

EXAMPLE 10

41.7 parts of the solution of the azo macroinitiator from Example 6 were added to a mixture of methyl methacrylate (38.9 parts), butyl acrylate (38.0 parts), methacrylic acid (3.1 parts), and MEK (128.0 parts). The solution was thoroughly purged with nitrogen and heated at 80° C. with stirring for 20 hours. The conversion of the monomer was 100%. Next, a mixture of 2.4 parts 25% aqueous ammonia solution and 403 parts water was added slowly with stirring. After solution had occurred, the solvent was removed by vacuum distillation to yield an aqueous dispersion with a solids content of 19.1%.

EXAMPLE 11

MEK was removed from the azo macroinitiator solution of Example 4 by distillation in vacuo. 20.0 parts of the solid substance of this azo macroinitiator were dissolved in a mixture of 41.0 parts methyl methacrylate, 37.5 parts butyl acrylate, and 1.5 parts methacrylic acid, and the solution was thoroughly purged with nitrogen. Next, it was emulsified with vigorous stirring in an emulsifier solution, also well-purged with nitrogen, composed of NP 307 (Henkel AG): 5.7 parts (solids content 70%); AES 42 (Henkel AG): 11.4 parts (solids content 35%); water: 183 parts. The preemulsion thus obtained was then heated at 82° C. with stirring for 7 hours. The solids content of the emulsion thus obtained was 30.2%; the monomer conversion was approximately 75%.

EXAMPLE 12

MEK and 1,4-dioxane were removed from the azo macroinitiator solution of Example 6 by distillation in vacuo. 30.0 parts of the solid substance of this azo macroinitiator were dissolved in a mixture of 70.0 parts styrene and 50 parts toluene, and the solution was thoroughly purged with nitrogen. Next, it was emulsified with vigorous stirring in an emulsifier solution, also well-purged with nitrogen, composed of NP 407: 5.7 parts (solids content 70%); AES 21: 13.3 parts (solids content 30%); water: 189 parts. The preemulsion thus obtained was then heated at 84° C. with stirring for 6 hours. The solids content of the emulsion thus obtained was 22.4%; the monomer conversion was approximately 57%.

EXAMPLE 13

MEK and 1,4-dioxane were removed from the azo macroinitiator solution of Example 6 by distillation in vacuo. 30.0 parts of the solid substance of this azo macroinitiator were dissolved in a mixture of 70.0 parts methyl methacrylate and 50 parts toluene, and the solution was thoroughly purged with nitrogen. Next, it was emulsified with vigorous stirring in an emulsifier solution, also well-purged with nitrogen, composed of NP 407: 5.7 parts (solids content 70%); AES 21: 13.3 parts (solids content 30%); water: 189 parts. The preemulsion thus obtained was then heated at 85° C. with stirring for 7 hours. The solids content of the emulsion thus obtained was 29.3%; the monomer conversion was approximately 91%.

What is claimed is:

1. An aqueous block copolymer emulsion having a solids content between 10 and 90 weight percent and having been prepared by heating an emulsified mixture of at least one vinyl monomer and an azo-macro-initiator in water, said azo-macro-initiator having a number average molecular weight between 1,500 and 60,000, being insoluble in water and soluble in said at least one vinyl monomer, and having been prepared by reaction of at least one prepolymer having isocyanate-reactive end groups, said prepolymer being selected from the group consisting of polyurethanes, polyacrylates, polymethacrylates, polyesters, polybutadienes, aminopropyldimethylpolysiloxanes, polydimethylsiloxanecarbinols, polyethers, polyepoxides, polylactones, polycarbonates and polyamides, with an azodiisocyanate prepared by reaction of a diisocyanate and a thermally decomposable azo-initiator containing at least 2 hydroxy groups.

2. Process for production of an aqueous block copolymer emulsion comprising heating an emulsified mixture of at least one vinyl monomer, water-insoluble solvent and an azo-macro-initiator in water, said azo-macro-initiator having a number average molecular weight between 1,500 and 60,000, being insoluble in water and soluble in said at least one vinyl monomer, and having been prepared by reaction of at least one prepolymer having isocyanate-reactive end groups, said prepolymer being selected from the group consisting of polyurethanes, polyacrylates, polymethacrylates, polyesters, polybutadienes, aminopropyldimethylpolysiloxanes, polydimethylsiloxanecarbinols, polyethers, polyepoxides, polylactones, polycarbonates and polyamides, with an azodiisocyanate prepared by reaction of a diisocyanate and a thermally decomposable azo-initiator containing at least 2 hydroxy groups.

\* \* \* \* \*